Aug. 16, 1932.                    C. E. POWER                    1,872,002

DELINTING MACHINE FOR COTTON SEED AND PROCESS

Filed Aug. 13, 1930

INVENTOR
C. E. POWER
BY Hazard and Miller
ATTORNEYS

Patented Aug. 16, 1932

1,872,002

UNITED STATES PATENT OFFICE

CLAUDE E. POWER, OF HUNTINGTON PARK, CALIFORNIA

DELINTING MACHINE FOR COTTON SEED AND PROCESS

Application filed August 13, 1930. Serial No. 474,940.

My invention relates to a delinting machine for cotton seed and the method of operation.

An object of my invention is to obtain a thorough delinting of the cotton seed after the cotton has been removed therefrom in a ginning process under ginning operations and at the same time that the seeds are delinted to remove the lint by a suction procedure.

A further object and feature of my invention is the elimination of saws or equivalent devices in a delinting machine and to effect this delinting mainly by the use of stiff wire brushes, these brushes causing the lint to adhere thereto and thus to remove the lint from the seeds, and subsequently remove the lint from the brushes by a suction action.

Another object and feature of my invention is the employment of a rotary wire or other stiff type of brush with an arrangement for feeding the seeds in at one end of the brush and causing the seeds to have a continuous feed from one end of the brush to the other, the seeds being successively acted on by different portions of the brush, and such brush removing the lint in the passage and contact of the seeds and the brush.

As a further feature of my machine and operation I employ a vacuum or suction for drawing the lint from the machine and from the brushes.

Another object and feature of my invention is the employment of a casing or housing for the brush having a series of cam or similarly shaped surfaces by which the seeds are caused to pack or roll against the periphery of the rotating brush and thus give a scouring action to the seeds whereby the bristles of the brush may catch and remove the lint fibres from the seed.

A further detail feature of my invention is to provide this structure having the cam-shaped surfaces with a series of perforations through which air is sucked and such air being withdrawn from the top of the machine above the brushes and carrying the lint.

A further feature of my invention involves the feeding of the lint covered and polished seeds by using a series of adjustably mounted partitions above the rotating brush so that by varying the tilt of these partitions the rate of forward feed of the lint covered and polished seeds may be regulated.

My invention is illustrated in connection with the accompanying drawing in which.

Figure 1:
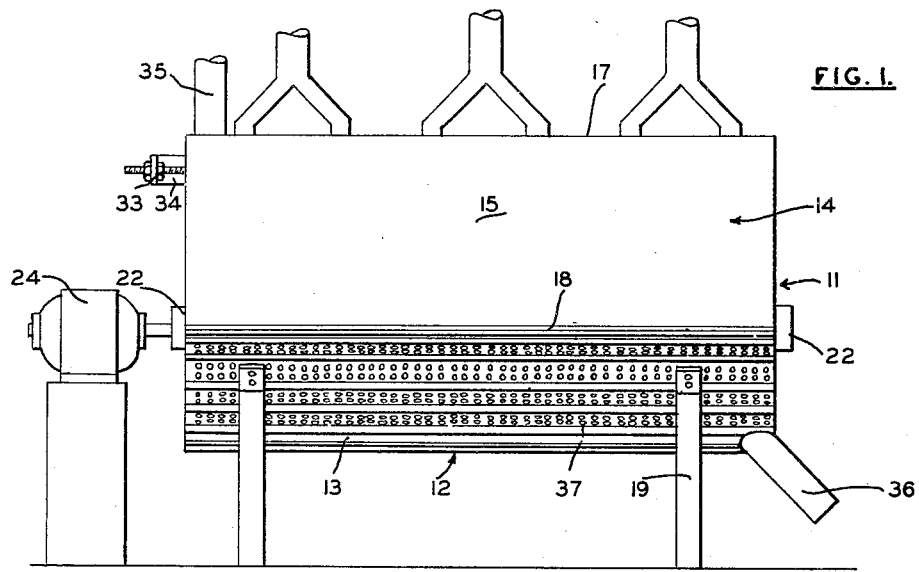
Fig. 1 is a side elevation of my machine.
Figure 2:
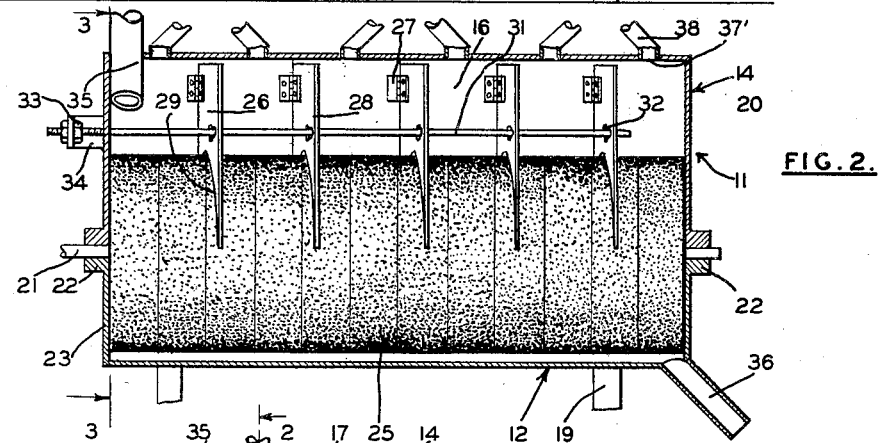
Fig. 2 is a longitudinal section taken on the line 2—2 of Fig. 3 in the direction of the arrows.
Figure 3:
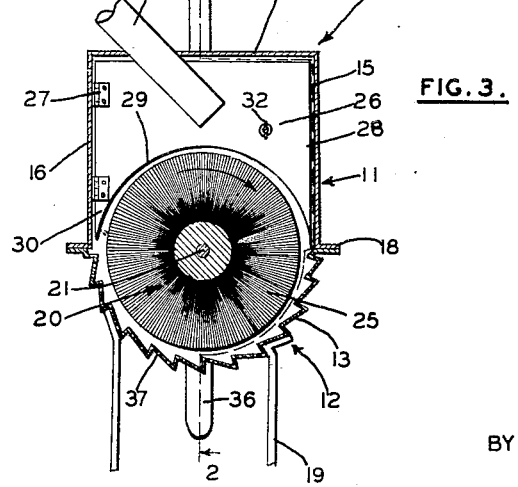
Fig. 3 is a transverse section on the line 3—3 of Fig. 2 in the direction of the arrows.

In the illustrations I utilize a casing or housing 11 which has a bottom or base section 12, this section having a series of cam-shaped surfaces 13, such being formed by a zig-zag formation of the bottom forming, in effect, a series of corrugations or grooves, such corrugations running lengthwise of the lower section. The lower section has a concave curvature on the inside and the main portion of this is substantially concentric with the axis of the brushes hereinunder detailed.

The upper part 14 of the casing has front and rear walls 15 and 16 and a top 17. The lower and upper sections are illustrated as connected by flanges 18 which may be bolted together to allow ready dismantling of the machine. Supports 19 are indicated as engaging the bottom or base 12 of the casing.

A brush 20 is mounted on a shaft 21 which has journals 22 in the opposite ends 23 of the casing. This shaft is indicated as being driven by an electric motor 24. The brushes are preferably formed in individual sections 25 and are preferably made with stiff bristles, such as a wire brush. The brush as a whole is made in sections for simplicity of manufacture, assembly, and repairs. Above the brush in the upper part of the housing there are a series of adjustable partitions 26. These partitions are illustrated as being hinged on one side 27 to the back wall of the machine, having their front edge 28 free to move. The partitions have a concave curve 29 at the bottom which is splayed outwardly slightly at each side as indicated at 30. The curvature 29 is not concentric with the brush but at the lower portion has a greater radius of curvature to allow a backward and forward motion of the partitions, which action is effected through the medium of an adjusting rod 31 which extends through each partition and is held adjustable thereon by cotter pins 32 or the like through the rod on each side of the partition. The partitions have relatively large holes so that there is no binding of the rod as it is adjusted by the adjusting nuts 33 on the bracket 34, such bracket being on one end of the casing. It will be apparent that by moving the rod 26 all of the partitions may have their inclination relative to a direct, transverse line of the brush adjusted, and this inclination is the factor used in adjusting the feed of the linters and seeds through the machine.

The seeds are fed into the machine through a chute 35 at one end which is indicated as entering through the top 17. This chute discharges above the brush at the in-feeding end between the end of the machine and the first partition. It will be noted that there is a considerable clearance between the top of the brushes and the under side of the partitions, and also between the bottom of the brush and the cam-shaped surfaces in the bottom 12 of the casing. This clearance allows passage of the seeds and allows a more or less packing of the seeds so that the brushes may effect a scouring action and at the same time carry the seeds in a circular direction. The seeds as they are carried over the top of the brush meet the inclined partitions and thus gradually feed toward an outlet spout 36 at the discharge end of the machine.

The suction, for removing the lint, is effected through a series of perforations 37 in the bottom or base 12 of the machine and through a series of outlet ports 37', which have pipes 38 connected thereto, these pipes being connected with a suitable suction or vacuum machine. By this type of action the air is drawn in through the bottom or base of the machine and passes upwardly around the brushes; and above the brushes the air flow carries the lint through the pipes 38, and, also, the flow of air removes the lint from the brushes so that there is continuous action of removing the lint from the upper part of the casing and also from the brushes. The brushes have a continuous operation of becoming covered with the lint from the seeds so that at the end of the machine the seeds pass out with a very minor portion of lint left on them, some seeds being entirely clean and others possibly having a small amount of lint attached to opposite ends.

In the action of my machine the rotating brush crowds the seeds between the base or bottom 12 of the machine and the brushes although the clearance space is greater than the largest dimension of any one seed. However, the seeds pack and are rolled one over the other and crowded by the cam surfaces 13 into contact with the periphery of the wire brushes. These brushes then function to strip the lint off the seeds and, in addition, carry the seeds upwardly. The centrifugal action tends to separate the lint from the wires of the brush and this, together with the suction, effectively removes the lint from between the diverting partitions. It is possible, therefore, to sort the lint in accordance with the stage at which the seeds progress through the machine, but ordinarily I collect the lint in one mass.

It is to be noted in my machine that the seeds are advanced by contacting with the diverting partitions 26 which are located above the brush and in this diverting action the seeds do not contact with the case but are in a more or less free movement, being, to a certain extent, carried by the brushes.

In the operation of my machine the sand, dirt, and dust which is carried by the seeds and the lint sifts toward the bottom or base and drops outwardly through the openings in the base.

Various changes may be made in the details of construction without departing from the spirit or scope of the invention as defined by the appended claims.

I claim:

1. A delinting machine comprising in combination a casing having a somewhat cylindrical brush rotatably mounted therein with the bristles extending toward the periphery, the base of the casing being somewhat concentric to the brush and having cam surfaces therein, an in-feeding means for seeds at one end of the casing, adjustable diverting means to progressively feed the lint coated seeds longitudinally of the brush, a discharge means for the clean seeds at the opposite end of the casing, and a suction means to withdraw the lint located between the diverting means.

2. A delinting machine as claimed in claim 1, the suction means comprising a vacuum suction connection at the top of the casing above the brush, and the base of the casing having perforations for the inflow of air.

3. A delinting machine comprising in combination a casing having a rotatable brush extending therethrough from end to end, the base of the casing being substantially concentric to the brush, diverting partitions positioned above the brush and partly encircling the same, there being a clear space below the brush extending longitudinally of the casing, an in-feeding means at one end of the casing above the brush, a discharge means for clean seeds at the opposite end of the casing below the brush, and a suction means connected above the brush between the partitions for the removal of lint.

4. A delinting machine as claimed in claim 3, the base of the casing having a series of cam surfaces extending longitudinally thereof, such surfaces being adapted to force the seeds against the periphery of the brush.

5. A delinting machine comprising in combination an elongated casing having a rotatable cylindrical brush extending therethrough from end to end, the base of the casing being substantially concentric to the brush and spaced a slight distance from the periphery thereof, a plurality of diverting partitions adjustably mounted in the casing above the brush and partly encircling the brush, said partitions having one edge shiftable longitudinally of the brush to divert the seeds, an in-feeding means at one end of the casing above the brush, a discharge means for clean seeds at the other end of the casing below the brush, a suction means for removal of lint connected to the upper part of the casing above the brush, the base having perforations for the inflow of air.

6. A delinting machine comprising in combination an elongated casing having a cylindrical brush extending therethrough from end to end and rotatably mounted, said brush having the bristles extending radially, the base of the casing being concentric to the brush slightly spaced therefrom with cam surfaces to force the seeds against the brush, a series of diverting partitions located in the casing above the brush hinged to one side of the casing with the free edge adapted to move longitudinally of the brush, the said partitions extending partly over the sides of the brush, an in-feeding means at one end of the casing above the brush, a discharge means for clean seeds at the other end of the casing below the brush, a suction means for removal of lint in the upper part of the casing between the partitions, and the base having perforations for inflow of air.

7. In a delinting machine a rotatable cylindrical brush having bristles extending radially, means to feed seeds carrying lint to the brush, means to force seeds into contact with the periphery of the brush, a series of partitions on one side of the brush to divert the seeds longitudinally of the brush, there being a free space on the side of the brush having the partitions, and a suction means for removing lint located between the partitions.

8. In a delinting machine, an elongated casing, a rotatable brush therein having radial bristles, means to feed seeds at one end of the casing and to remove the delinted seeds at the other end, the casing having a series of partial partitions above the brush, a plurality of inlets for air in the casing below the brush, and suction means for removal of lint between the partitions above the brush.

9. In a delinting machine as claimed in claim 8, said partitions extending partly downwardly over the upper and side portion of the brush but leaving a clear space below the brush for the feeding of seeds, and said partitions being tiltable considered longitudinally of the brush to effect a longitudinal feeding of the seeds from one end of the brush to the other.

10. A delinting machine comprising, in combination, an elongated casing, a cylindrical brush having radial bristles rotatably mounted therein, the lower part of the casing being concentric to the brush and relatively close thereto, the upper portion of the casing being spaced from the brush and having a plurality of partial partitions therein, said partitions extending over the top of the brush and partly down the side of the brush, means to feed seeds into the casing at one end above the brush, and means to remove delinted seeds from the bottom of the casing at the opposite end below the brush, the casing having a series of perforations in the bottom below the brush for inflow of air, and a plurality of outlets for outflow of air above the brush between the partitions for the removal of lint, said partitions effecting a grading of the lint.

11. A delinting machine as claimed in claim 10, the bottom of the casing having a series of corrugations forming cam-shaped structures extending longitudinally thereof to force the seeds at the bottom of the casing against the brush.

12. A delinting machine as claimed in claim 10, the partitions being hinged to one side of the casing, and a rod extending longitudinally through the partitions and through one end of the casing to simultaneously adjust the inclination of said partitions considered longitudinally of the brush to effect a longitudinal feeding of the seeds.

13. In the method of delinting seeds, comprising subjecting such seeds to a brushing action and flowing a current of air upwardly while the seeds are being subjected to such action, and by a vacuum suction withdrawing the lint in a plurality of stages and thereby grading the lint.

14. In the method of delinting seeds, comprising subjecting seeds to a brushing action while moving the seeds in a longitudinal direction, flowing air upwardly during such brushing action, withdrawing the air by suction in a plurality of stages during the longitudinal movement of the seeds and thereby grading the lint.

15. In the method of delinting seeds, comprising subjecting seeds to a rotary brushing action and moving the seeds in a longitudinal direction, flowing air upwardly during the brushing action, and withdrawing the air and lint in a plurality of stages during the longitudinal movement of the seeds and thereby grading the lint.

In testimony whereof I have signed my name to this specification.

CLAUDE E. POWER.